United States Patent
Lindem, III et al.

(10) Patent No.: US 12,126,461 B2
(45) Date of Patent: *Oct. 22, 2024

(54) SD-WAN MULTICAST REPLICATOR SELECTION CENTRALIZED POLICY

(71) Applicant: Cisco Technology, Inc., San Jose, CA (US)

(72) Inventors: Alfred C. Lindem, III, Cary, NC (US); Ravi Kiran Chintallapudi, Pleasanton, CA (US); Gaurav Shrivastava, Fremont, CA (US); Jining Tian, Cupertino, CA (US); Praleshkumar Gunvantray Patel, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,056

(22) Filed: Jun. 13, 2022

(65) Prior Publication Data

US 2022/0311630 A1    Sep. 29, 2022

Related U.S. Application Data

(63) Continuation of application No. 17/101,968, filed on Nov. 23, 2020, now Pat. No. 11,362,849.

(51) Int. Cl.
*H04L 12/18* (2006.01)
*H04L 67/1095* (2022.01)

(52) U.S. Cl.
CPC ........ *H04L 12/185* (2013.01); *H04L 12/1886* (2013.01); *H04L 67/1095* (2013.01)

(58) Field of Classification Search
CPC ............... H04L 12/185; H04L 12/1886; H04L 67/1095
See application file for complete search history.

(56) References Cited

U.S. PATENT DOCUMENTS 9,774,539 B1 *  9/2017  Jia .......................... H04L 47/283
9,806,895 B1    10/2017 Kommula et al.
(Continued)

FOREIGN PATENT DOCUMENTS

WO    2017221050    12/2017

OTHER PUBLICATIONS

PCT Notification of Transmittal of the Intl. Search Report and the Written Opinion of the Intl. Searching Authority, or the Declaration, Intl. Appln. PCT/US2021/072354, Feb. 23, 2022.

(Continued)

*Primary Examiner* — Mohamed A. Wasel
(74) *Attorney, Agent, or Firm* — Baker Botts L.L.P.

(57) ABSTRACT

The present disclosure is directed to a centralized control policy for multicast replicator selection. Methods include receiving multicast advertisements from a plurality of edge devices configured with multicast protocol, each multicast advertisement including information indicating whether an associated edge device is a replicator; analyzing multicast advertisements from the plurality of edge devices to identify one or more replicators; receiving a centralized policy configuration associated with at least one control policy that includes a preference related to selection of at least one replicator from the identified one or more replicators, the preference applicable to a defined set of edge devices from the plurality of edge devices; and updating at least one multicast advertisement with the control policy for transmission to the defined set of edge devices, the updated at least one multicast advertisement indicating the preference for replicator selection for the defined set of edge devices based on the control policy.

20 Claims, 4 Drawing Sheets

(56) References Cited

U.S. PATENT DOCUMENTS

| | | |
|---|---|---|
| 9,998,291 B1 | 6/2018 | Khan et al. |
| 10,530,656 B2 | 1/2020 | Guo et al. |
| 10,778,457 B1* | 9/2020 | Mathew ............... H04L 67/563 |
| 11,071,005 B2 | 7/2021 | Shen et al. |
| 11,159,337 B1 | 10/2021 | Mishra et al. |
| 11,233,741 B1* | 1/2022 | N ........................... H04L 47/15 |
| 2014/0025986 A1 | 1/2014 | Kalyanaraman et al. |
| 2015/0112933 A1* | 4/2015 | Satapathy ............... H04L 41/40 707/634 |
| 2015/0195178 A1 | 7/2015 | Bhattacharya et al. |
| 2015/0236900 A1 | 8/2015 | Chung |
| 2016/0323116 A1* | 11/2016 | Garofalo ............ H04L 12/1868 |
| 2017/0214619 A1 | 7/2017 | Chu et al. |
| 2018/0191600 A1 | 7/2018 | Heckr |
| 2018/0254988 A1 | 9/2018 | Jeng et al. |
| 2019/0123962 A1* | 4/2019 | Guo ....................... H04L 41/12 |
| 2019/0222537 A1 | 7/2019 | Kodavanty |
| 2019/0288943 A1 | 9/2019 | Sivaraj et al. |
| 2019/0334813 A1* | 10/2019 | Raj ....................... H04L 41/122 |
| 2020/0067818 A1 | 2/2020 | Jeuk et al. |
| 2020/0235959 A1 | 7/2020 | Narayanan et al. |
| 2021/0099380 A1* | 4/2021 | Suryanarayana ... H04L 41/0806 |
| 2021/0160169 A1 | 5/2021 | Shen et al. |
| 2021/0328909 A1* | 10/2021 | Dutta .................. H04L 12/4641 |
| 2022/0116312 A1* | 4/2022 | Suryanarayana ....... H04L 41/20 |

OTHER PUBLICATIONS

Rabadan J. et al., "Optimized Ingress Replication Solution for EVPN" draft-ietf-bess-evpn-optimized-ir-06, Oct. 19, 2018.

Office Action for Japanese Application No. 2023516662, dated Apr. 22, 2024, 10 Pages.

Office Action for Japanese Application No. 2023516662, dated Aug. 7, 2024, 8 Pages.

* cited by examiner

FIG. 1

```
                              ┌─ 200
policy
  lists
    site-list west-sites ⎫
      site-id 1          ⎬ 210
      site-id 2          ⎪
      site-id 5          ⎭
    prefix-list Foo              ⎫
      ip-prefix 232.0.0.1/32     ⎬ 220
      ip-prefix 234.0.0.0/24     ⎭
  control-policy prefer-chicago-replicator } 230
    sequence 10                                    ⎫
      match multicast-route                        ⎪
        originator 10.100.1.1                      ⎪
        prefix-list Foo                            ⎬ 240
      action accept                                ⎪
        set replicator preference 1000 preempt     ⎭
    sequence 15                        ⎫
      match route                      ⎪
        originator 10.100.1.12         ⎬ 250
      action reject                    ⎭
  apply-policy                                                            ⎫
    site west-sites control-policy prefer-chicago-replicator out          ⎬ 260
```

SD-WAN MULTICAST REPLICATOR SELECTION CENTRALIZED POLICY

RELATED APPLICATION

This application is a continuation application under 35 U.S.C. § 120 of U.S. patent application Ser. No. 17/101,968 filed on Nov. 23, 2020, entitled "SD-WAN Multicast Replicator Selection Centralized Policy," which is incorporated herein by reference in its entirety.

TECHNICAL FIELD

The present disclosure generally relates to software-defined wide area network (SD-WAN) multicast replicator selection, and more specifically to systems and methods for SD-WAN multicast replicator selection based on a centralized policy.

BACKGROUND

IP multicast is a bandwidth-conserving technology that reduces traffic by simultaneously delivering a single stream of information to potentially thousands of corporate recipients and homes (e.g., receivers). Multicast packets are replicated in the network at the point where paths diverge by edge devices enabled with Protocol Independent Multicast (PIM) and/or other supporting multicast protocols, resulting in efficient delivery of data to multiple receivers.

DESCRIPTION OF EXAMPLE EMBODIMENTS

Overview

According to an embodiment, a system may include one or more processors and one or more computer-readable non-transitory storage media comprising instructions that, when executed by the one or more processors, cause one or more components of the system to perform operations including, receiving multicast advertisements from a plurality of edge devices, each edge device of the plurality of edge devices configured with a multicast protocol, and each multicast advertisement including information indicating whether an associated edge device is a replicator; analyzing the multicast advertisements from the plurality of edge devices to identify one or more replicators; receiving a centralized policy configuration associated with at least one control policy that includes a preference related to selection of at least one replicator from the identified one or more replicators, the preference applicable to a defined set of edge devices from the plurality of edge devices; and updating at least one multicast advertisement associated with the at least one replicator with the control policy for transmission to the defined set of edge devices, the updated at least one multicast advertisement indicating the preference for replicator selection for the defined set of edge devices based on the control policy.

Moreover, the plurality of edge devices may be configured over a software-defined wide area network (SD-WAN).

Additionally, the preference may be based on at least one of the following: a proximity of the at least one replicator to the defined set of edge devices; a capacity of the at least one replicator relative to the one or more replicators; a distribution of load of the at least one replicator relative to the one or more replicators; or an administrative consideration.

Moreover, the preference may include a high preference associated with the at least one replicator; or a low preference associated with the at least one replicator. Additionally, the high preference may further include a preemptive preference for directing existing multicast flows to the at least one replicator.

Additionally, the control policy may be further associated with a defined multicast prefix list associated with a set of multicast group prefix and prefix length tuples, and wherein the defined multicast prefix list is transmitted to the defined set of edge devices. Moreover, the control policy may be further associated with a defined multicast prefix list associated with a set of multicast group prefix, prefix length, and source tuples, and wherein the defined multicast prefix list is transmitted to the defined set of edge devices.

According to another embodiment, a method may include the steps of receiving multicast advertisements from a plurality of edge devices, each edge device of the plurality of edge devices configured with a multicast protocol, and each multicast advertisement including information indicating whether an associated edge device is a replicator; analyzing multicast advertisements from the plurality of edge devices to identify one or more replicators; receiving a centralized policy configuration associated with at least one control policy that includes a preference related to selection of at least one replicator from the identified one or more replicators, the preference applicable to a defined set of edge devices from the plurality of edge devices; and updating at least one multicast advertisement associated with the at least one replicator with the control policy for transmission to the defined set of edge devices, the updated at least one multicast advertisement indicating the preference for replicator selection for the defined set of edge devices based on the control policy.

According to yet another embodiment, one or more computer-readable non-transitory storage media may embody instructions that, when executed by a processor, cause the performance of operations, including receiving multicast advertisements from a plurality of edge devices, each edge device of the plurality of edge devices configured with a multicast protocol, and each multicast advertisement including information indicating whether an associated edge device is a replicator; analyzing multicast advertisements from the plurality of edge devices to identify one or more replicators; receiving a centralized policy configuration associated with at least one control policy that includes a preference related to selection of at least one replicator from the identified one or more replicators, the preference applicable to a defined set of edge devices from the plurality of edge devices; and updating at least one multicast advertisement associated with the at least one replicator with the control policy for transmission to the defined set of edge devices, the updated at least one multicast advertisement indicating the preference for replicator selection for the defined set of edge devices based on the control policy.

Technical advantages of certain embodiments of this disclosure may include one or more of the following. Conventional SD-WAN multicast replicator selection configurations are based solely on the status of locally configured replicators, the threshold of the replicator route, and/or the physical location of the replicator. In these scenarios, edge devices must perform ingress replication of multicast flows to all other edge devices having receivers in their sites. The systems and methods described herein may allow for the centralized selection of multicast replicators in a SD-WAN network, thereby overcoming the foregoing deficiencies of local replication configurations. In particular, a centralized control policy may allow for revertive behavior (by allowing multicast flows to be moved to a more preferred replicator), account for client preferences (e.g., redundancy requirements, etc.), allow for at least one level of backup replicator if the preferred replicator fails, choose different replicators based on multicast groups or multicast group/source tuples, and allow for backward compatibility with existing configurations.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Multicast is a method of group communication in which data is transmitted to a plurality of recipients in a single transmission. Using multicast, a source may send a data packet to a single multicast IP address. The multicast IP address corresponds to a multicast group (i.e., comprising a set of recipients that are interested in a particular data stream). The source may simply set the destination IP address of the data packet to be the multicast IP address. The data packet sent to the multicast IP address is then forwarded to a network device (e.g., a router) which replicates the packet and forwards it toward the set of recipients in the multicast group.

At the heart of multicast is packet replication, the process of making multiple physical copies of a particular packet and sending the copies to the destination interfaces in the forwarding path. SD-WAN edge devices may be deployed and configured as replicators throughout an SD-WAN overlay network. Replicators advertise themselves to the central controller in the overlay network, and the controllers then forward the replicator location information to the multicast protocol-enabled edge devices (e.g., Protocol Independent Multicast (PIM) enabled edge devices) that are in the same VPN as the replicator. Thus, a replicator receives data streams from multicast sources, replicates them, and forwards them to edge devices with multicast receivers in the same VPN.

As described above, edge devices subscribe to a replicator over the SD-WAN fabric, the source will send data packets to the replicator, and the replicator will forward the data packets out to the receivers. Conventionally, each edge device must locally select a replicator, which may be a coarse decision. The present disclosure attempts to improve on conventional technology by introducing a mechanism for multicast replicator selection based on a centralized control policy in SD-WAN.

Figure 1:
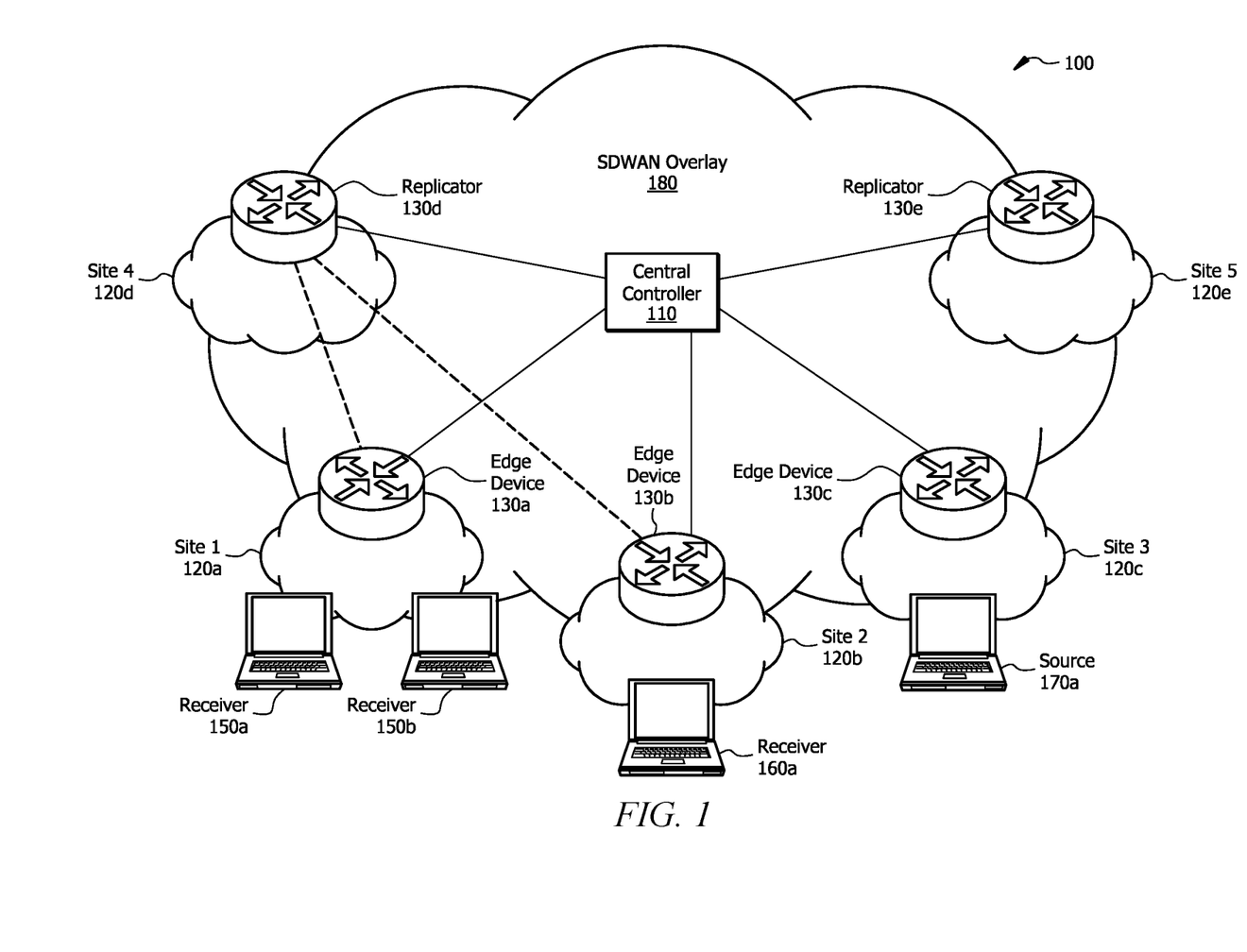
FIG. 1 illustrates a system for multicast replicator selection using a centralized control policy, in accordance with certain embodiments.

FIG. 1 depicts a system 100 for multicast replicator selection in a SD-WAN using a centralized control policy, in accordance with the present disclosure. System 100 may be configured in a SD-WAN overlay 180 and may include at least one central controller 110 for coordinating centralized management of system 100, and in particular, for configuration of a centralized control policy for multicast replicator selection. Although a single central controller is shown in FIG. 1, it is to be understood that system 100 may include any number of central controllers. The central controller 110 may comprise a control module for, inter alia, running an overlay management protocol (OMP). In SD-WAN, OMP is the control protocol used to exchange routing, policy, and management information between the central controller 110 and the edge devices in the network, as well as to establish and maintain the control plane, including orchestrating overlay network communication and connectivity between edge devices.

System 100 may further include a plurality of sites 120a-e. FIG. 1 shows Site 1 120a, Site 2 120b, Site 3 120c, Site 4 120d, and Site 5 120e. A site refers to a physical location in the SD-WAN network 180 where one or more edge devices (also referred to as "nodes") 130a-e may reside. For example, a branch office of an enterprise may be a site and may comprise a plurality of edge devices. An edge device provides an entry point into an enterprise or service provider network. Examples of edge devices include routers, routing switches, integrated access devices (IADs), and wide area network (WAN) access devices. In FIG. 1, each of the plurality of sites 120a-e includes a single edge device (i.e., edge device 130a in Site 1 120a, edge device 130b in Site 2 120b, edge device 130c in Site 3 120c, edge device 130d in Site 4 120d, and edge device 130e in Site 5 120e). But, it is to be understood that a given site may have multiple edge devices. The edge devices 130a-e are collectively referred to as the "plurality of edge devices."

Moreover, it is to be presumed that Sites 1 and 2120a, 120b are multicast sites and edge devices 130a, 130b are configured with a multicast protocol, such as Protocol Independent Multicast (PIM) or Internet Group Management Protocol (IGMP) version 3 multicast routing. Likewise, Sites 3, 4, and 5 120c, 120d, 120e are multicast sites and their associated edge devices 130c, 130d, 130e are configured with PIM routing. Additionally, edge device 130a is located at a site (Site 1 120a) that has two multicast receivers 150a, 150b located in local sites behind the edge device 130a. The multicast receivers 150a, 150b are configured with local site PIM routers (not shown). Similarly, edge device 130b is located at a site (Site 2 120b) that has one multicast receiver 160a that is located at a local site behind edge device 130b and is configured with a local site PIM router. Finally, edge device 130c is located at Site 3 120c having a multicast source 170a that is located at a local site behind edge device 130c and is configured as a local site PIM router. Moreover, OMP control protocol in the SD-WAN overlay is used to connect all the remote PIM islands. It is to be understood that Sites 1, 2, and 3 may be configured in any manner, and may include any number of edge devices serving as source and/or receiver devices. However, for purposes of illustration, Site 1 120a and its corresponding edge device 130a are shown to receive multicast flows; Site 2 120b and its corresponding edge device 130b are shown to receive multicast flows; and Site 3 and its corresponding edge device 130c are shown to send multicast flows.

With continued reference to FIG. 1, one or more edge devices 130d-e of the plurality of edge devices 130a-e may be configured as SD-WAN multicast replicators. Specifically, edge device 130d is a multicast replicator located in Site 4 120d, and edge device 130e is a multicast replicator located in Site 5 120e. Accordingly, in FIG. 1, edge devices 130d, 130e are each labeled as a "replicator." As described above, multicast replicators receive data streams from multicast sources, replicate them, and forward them to edge devices having multicast receivers in the same VPN.

In operation, each of the plurality of edge devices 130a-e may send a multicast advertisement to the central controller 110 to advertise itself. In an embodiment, the multicast advertisements of edge devices 130a-e may comprise OMP multicast auto-discovery routes which are sent to the central controller 110 in the overlay network 180. The multicast advertisement may include information indicating whether the edge device sending the advertisement is a replicator. The central controller 110 may analyze the multicast advertisements received from the plurality of edge devices 130a-e to identify one or more edge devices 130d, 130e that function as multicast replicators in the network 180.

Next, the central controller 110 may receive a centralized policy configuration associated with at least one control policy. Specifically, the control policy may be configured by a user (or in certain instances, may be generated at or by a network device) for performance on the central controller 110. The control policy may assign a preference related to the selection of a replicator that is to be applied to a set of non-replicator edge devices. In other words, the control policy may define or list a set of edge devices and state a preference that the defined set of edge devices select or use (or not select/use) a given replicator for multicast flows. It is to be understood that the "set" of edge devices defined by the control policy may comprise one or more edge devices. In an embodiment, the defined set of edge devices may refer to edge devices that receive multicast flows (i.e., edge devices having multicast receivers at local sites, such as edge device 130a having multicast receivers 150a, 150b at its local sites and edge device 130b having multicast receiver 160a at its local site). For purposes of illustration, in FIG. 1, the defined set of edge devices may include edge devices 130a, 130b and the control policy (not shown) may state a preference associated with selecting a replicator (shown in FIG. 1 as edge device 130d). In an embodiment, the preference indicated by the control policy may correspond to a high (or favorable) preference for selecting a given replicator to receive multicast flows. A high preference may include a preemptive preference for directing existing multicast flows associated with the defined set of edge devices away from the current replicator to the replicator indicated by the control policy. In another embodiment, the preference indicated by the control policy may correspond to a low (or unfavorable) preference against selecting a given replicator, wherein the replicator may be used as a backup replicator for the defined set of edge devices or disqualified for use by the defined set of edge devices.

A preference may be determined based on various factors including, for example, the proximity of a replicator to the given set of edge devices (e.g., a replicator that is close in proximity to a set of edge devices may be assigned a high preference); the capacity of a replicator relative to one or more other replicators (e.g., a replicator having high capacity may be assigned a high preference); the distribution of load of a replicator relative to one or more other replicators (e.g., a replicator having a low load distribution may be assigned a high preference); and/or an administrative consideration associated with the replicator and/or the set of edge devices (e.g., for example, an administrative preference that all edge devices in a country use a replicator in that country).

Once the policy is configured on the central controller 110, the central controller 110 may then update the multicast advertisement(s) associated with preferred replicator(s) by adding the control policy and then transmit the updated multicast advertisement(s) to the defined set of edge devices. By way of example, in FIG. 1, the multicast advertisement associated with the preferred replicator (edge device 130d) is updated with the control policy indicating that the replicator (edge device 130d) is the preferred replicator to be used by the defined set of edge devices 130a-b, and that updated multicast advertisement is sent to the defined set of edge devices 130a-b. In another embodiment, the updated multicast advertisement may be sent to the plurality of edge devices 130a-e. The updated multicast advertisement will indicate the preference for replicator selection for the defined set of edge devices based on the control policy. As described above, the preference for replicator selection may include accepting (selecting) a replicator for new multicast flows, preempting existing multicast flows, disqualifying a replicator, and/or designating a replicator as a backup. Once the defined set of edge devices 130a-b receive the updated multicast advertisements, they may run a replicator selection algorithm and, in the example of FIG. 1, select the replicator (edge device 130d) for receiving multicast flows based on the preference set forth in the control policy.

In the example of FIG. 1, it is shown by the dotted lines that the control policy assigned a preference associated with a replicator (edge device 130d) to be applied to the defined set of edge devices 130a, 130b that are to receive multicast flows. In other words, the control policy defined the set of edge devices 130a, 130b and assigned a high (favorable) preference that the defined set of edge devices 130a, 130b use the replicator (edge device 130d) for receiving multicast flows, i.e., by directing their joins (their requests to receive multicast flows) toward the replicator (edge device 130d). The replicator, in turn, may learn about the source (e.g., source 170a) via a different multicast advertisement and send a join (i.e., request to receive the flow) to the edge device 130c at Site 3 120c. As a result, data packets sent by source 170a (which sits behind edge device 130c) will use the replicator (edge device 130d) for transmission of data streams to receivers 150a, 150b (which sit behind edge device 130a) and receiver 160a (which sits behind edge device 130b).

In an embodiment, the control policy may include a single preference associated with a selected set of edge devices. In another embodiment, the control policy may include different preferences for different sets of edge devices. For example, a control policy may define a first set of edge devices (e.g., east coast edge devices) and a second set of edge devices (e.g., west coast edge devices), and indicate a first preference that a first replicator be used for the defined first set of east coast edge devices, and a second preference that a second replicator be used for the defined second set of west coast edge devices.

In a further embodiment, multiple replicators may be selected for different multicast destinations or destinations/source pairs. Therefore, the control policy may include, in addition to a replicator preference, a defined multicast prefix list associated with a set of multicast group prefix and prefix length tuples or a set of multicast group prefix, prefix length, and source tuples. A multicast prefix acts to identify the route for a multicast flow. Thus, when the central controller transmits the updated multicast advertisement to an edge device, it may also transmit to the edge device (and the edge device may receive) the prefix list, which may then be used to select different replicators for different multicast groups or multicast group/source tuples. In an embodiment, the multicast source may be specified with a complete group address (i.e., prefix length 32 for IPv4 or 128 for IPv6), thereby allowing lookup to be a simple longest-prefix match on the group or the group/source pair. The multicast prefix list may be used to set up a longest-prefix match of the group, as well as for full group addresses, so that the preferred replicator may be dynamically selected during the reverse-path forwarding (RPF) check in the same way as forward information base (FIB) lookups. As understood in the art, an RPF check is done by potential receivers when determining where to send their joins requests (i.e., requests to receive a given multicast stream). These would be sent to the selected replicator (edge device 130d) and the replicator would, in turn, send a join to the source edge device 130c or PIM Rendezvous Point (RP) site.

It is to be understood that with multicast prefix lists, the multicast advertisements, e.g., the OMP multicast auto-discovery route, may need to be extended to include multiple tuples (e.g., <multicast-prefix-list, preference, preempt>) so that different combinations may be used (e.g., <group>/prefix-length/<group/source>). While the present disclosure does not limit the number of such tuples, it is to be understood that the implementation may only need to support a limited number of tuples.

Figure 2:
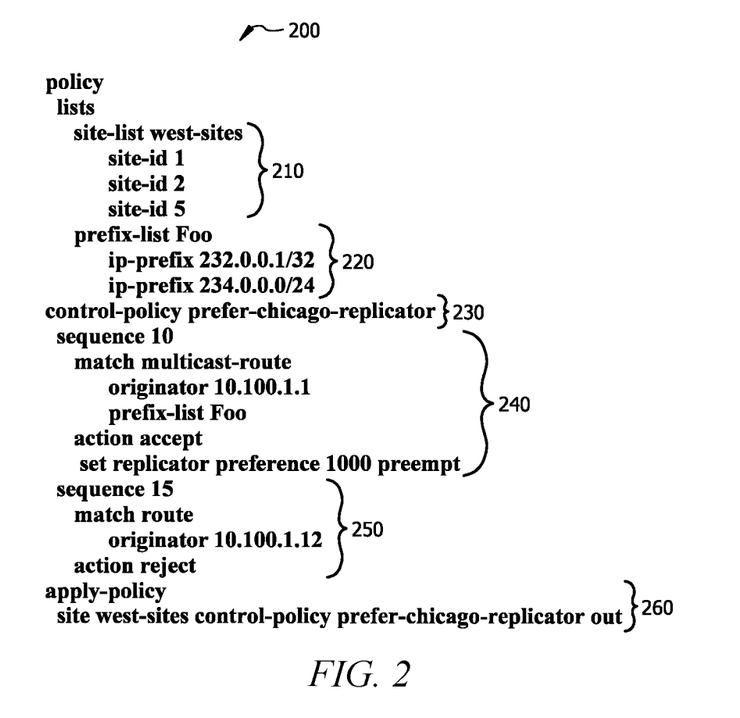
FIG. 2 illustrates example syntax of a centralized control policy which may be configured on a central controller, in accordance with certain embodiments.

Reference is now made to FIG. 2, which shows example syntax associated with a centralized control policy 200 which may be configured on a central controller, in accordance with the present disclosure. It is to be understood that the syntax of FIG. 2 is shown for purposes of illustration only, and may be adapted, revised, or otherwise modified in any manner to achieve the same or substantially the same results described in the present disclosure.

In the control policy 200, a set of edge devices (referred to in FIG. 2 as "site-id 1", "site-id 2", and "site-id 5", collectively referred to as the "west-sites" 210) may be defined for application of the policy. A multicast prefix list 220 may also be defined to identify the route for the multicast flows. The control policy 200 of FIG. 2 includes a preference 230 for a multicast replicator (referred to as the "Chicago-replicator"). The policy is further defined in two listed sequences 240, 250.

The first sequence 240 (labeled "sequence 10") establishes the match parameters for the multicast route, wherein the preferred replicator (corresponding to "originator" having IP address 10.100.1.1) is designated for multicast flows defined by the prefix list 220. The "action accept" and the "set replicator preference 1000 preempt" commands designate the preferred replicator and act to preempt existing flows when the replicator is selected to be configured on the listed edge devices.

The second sequence 250 (labeled "sequence 15") establishes the match parameters to disqualify a replicator. Specifically, the "action reject" commands would disqualify a replicator (corresponding to "originator" having IP address 10.100.1.2) from being used for any flows independent of preference when the policy is applied to an SD-WAN site.

The policy ends with the commands shown at element 260, wherein the foregoing control policy listing a preference for the "chicago-replicator" may be applied on the defined "west-sites."

Figure 3:
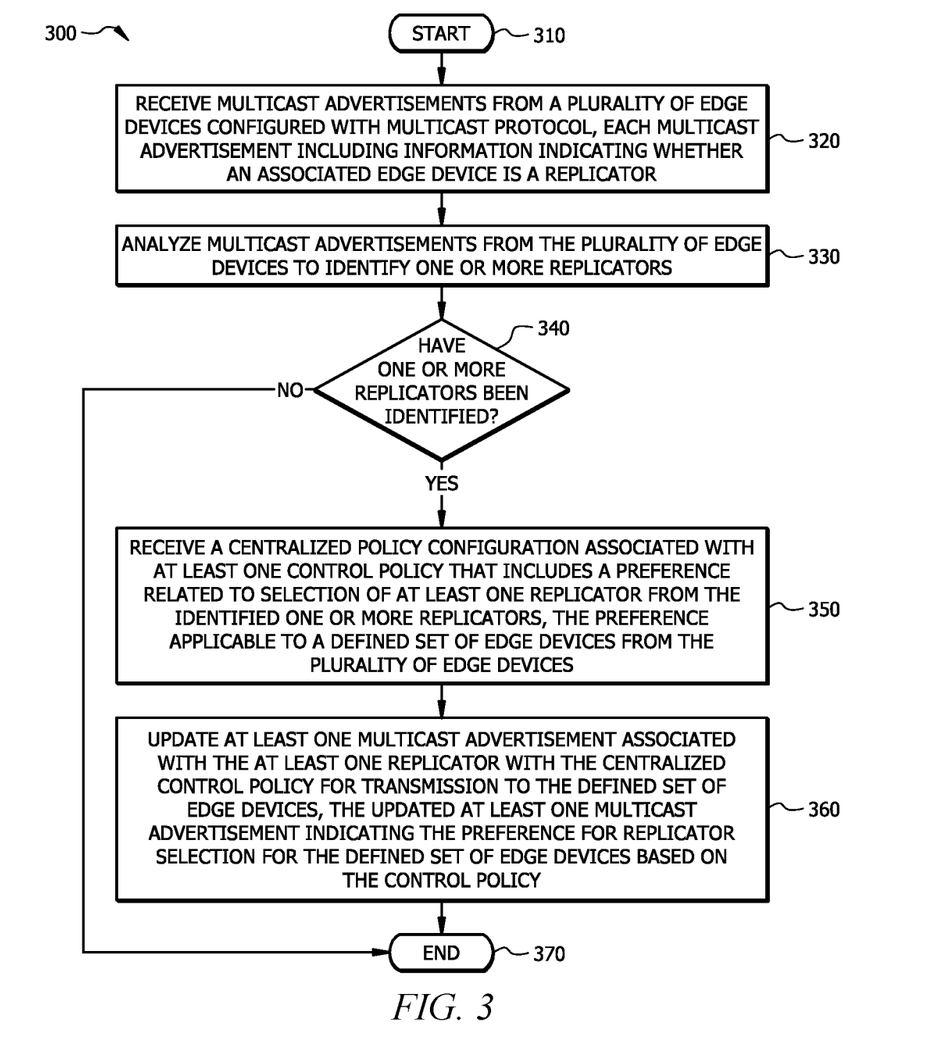
FIG. 3 illustrates a flow diagram of a method for multicast replicator selection using a centralized control policy, in accordance with certain embodiments.

Reference is now made to FIG. 3, which depicts a flow diagram of a method 300 for multicast replicator selection using a centralized control policy. The steps of method 300 may be in accord with the operations outlined in conjunction with the system 100 of FIG. 1. As such, similar and corresponding terms described in conjunction with FIG. 1 may have the same meaning when used in conjunction with method 300 of FIG. 3. Additionally, the present disclosure incorporates by reference the descriptions of system 100 for the purposes of explaining, expounding upon, or otherwise clarifying the steps of method 300.

Method 300 may be performed in a SD-WAN network having at least one central controller and a plurality of edge devices. In an embodiment, a central controller may be configured in a control and management plane of a network and may coordinate central management of the plurality of nodes in the network. In an embodiment, the central controller may include a control module for running OMP. In an embodiment, the steps of method 300 may be performed from the perspective of the central controller. However, it is to be understood that method 300 may be performed by any component, element, or module in a network without departing from the spirit or scope of the present disclosure.

An edge device provides an entry point into an enterprise or service provider network. Examples of edge devices include routers, routing switches, IADs, and WAN access devices. Each of the plurality of edge devices in the SD-WAN network may reside at a site or physical location in the SD-WAN network, and may be configured with a multicast protocol, such as PIM or IGMP version 3 routing. Each edge device may have one or more multicast receivers configured with PIM and located in local sites behind the edge device, and/or one or more multicast sources configured with PIM and located in local sites behind edge device. Moreover, OMP control protocol in the SD-WAN overlay is used to connect all the remote PIM islands.

Additionally, one or more edge devices of the plurality of edge devices may be configured as SD-WAN multicast replicators. As described above, multicast replicators receive data streams from multicast sources, replicate them, and forward them to edge devices having multicast receivers in the same VPN The method may begin at step 310. At step 320, the central controller may receive multicast advertisements from the plurality of edge devices configured with the multicast protocol. In other words, each edge device of the plurality of edge devices may transmit a multicast advertisement to the central controller. Each multicast advertisement may include information indicating whether the associated edge device (i.e., the edge device that sent the multicast advertisement) is a replicator. In an embodiment, the multicast advertisements may comprise OMP multicast auto-discovery routes.

At step 330, the central controller may analyze the multicast advertisements from the plurality of edge devices to identify one or more replicators. At step 340, a determination may be made as to whether one or more replicators have been identified. If, at step 340, it is determined that one or more replicators have not been identified, the method may end at step 370. If, however, at step 340, is it determined that one or more replicators have been identified, the method may proceed to step 350.

At step 350, the central controller may receive a centralized policy configuration associated with at least one control policy that includes a preference related to the selection of at least one replicator from the identified one or more replicators, the preference applicable to a defined set of edge devices from the plurality of edge devices. The centralized control policy may be configured by a user or may be generated at or by a network device for performance on the central controller. The control policy may define a set of edge devices and state a preference that the defined set of edge devices select or use (or not select/use) a given replicator for multicast flows. It is to be understood that the "set" of edge devices defined by the control policy may comprise one or more edge devices. The defined set of edge devices may comprise one or more edge devices that receive multicast flows. In an embodiment, the preference indicated by the control policy may correspond to a high (or favorable) preference for selecting a given replicator. A high preference may include a preemptive preference for directing existing multicast flows associated with the defined set of edge devices away from the current replicator to the replicator indicated by the control policy. In another embodiment, the preference indicated by the control policy may correspond to a low (or unfavorable) preference against selecting a given replicator, wherein the replicator may be used as a backup replicator for the defined set of edge devices or disqualified for use by the defined set of edge devices.

A preference may be determined based on one or more factors including, for example, the proximity of a replicator to the given set of edge devices (e.g., a replicator that is close in proximity to a set of edge devices may be assigned a high preference); the capacity of a replicator relative to one or more other replicators (e.g., a replicator having high capacity may be assigned a high preference); the distribution of load of a replicator relative to one or more other replicators (e.g., a replicator having a low load distribution may be assigned a high preference); and/or one or more administrative considerations associated with the replicator and/or the set of edge devices.

At step 360, the central controller may update at least one multicast advertisement associated with the at least one replicator with the centralized control policy for transmission to the defined set of edge devices, the updated at least one multicast advertisement indicating the preference for replicator selection for the defined set of edge devices based on the centralized control policy. In an embodiment, the central controller may transmit the updated at least one multicast advertisement to the defined set of edge devices. In another embodiment, the central controller may transmit the updated multicast advertisement listing the defined set of edge devices and the preference for replicator selection for that defined set of edge devices to the plurality of edge devices. Once the defined set of edge devices receive the updated multicast advertisements, they may run a replicator selection algorithm and select (or not select) the replicator based on the preference set forth in the control policy. At step 370, the method may end.

In an embodiment, the control policy may include a single preference associated with a defined set of edge devices. In another embodiment, the control policy may include multiple preferences associated with the defined set of edge devices (e.g. a high or favorable preference toward a first replicator, and a low or unfavorable preference toward a second replicator). In another embodiment, the control policy may include different preferences for different sets of edge devices. In a further embodiment, multiple replicators may be selected for different multicast destinations or destinations/source pairs. Therefore, the control policy may include, in addition to a replicator preference, a defined multicast prefix list associated with a set of multicast group prefix and prefix length tuples or a set of multicast group prefix, prefix length, and source tuples. A multicast prefix serves to identify the route for a multicast flow. Thus, when the central controller transmits the updated multicast advertisement to an edge device, it may also transmit (and the edge device may receive) the prefix list, which may then be used to select different replicators for different multicast groups or multicast group/source tuples. In an embodiment, the multicast source may be specified with a complete group address (i.e., prefix length 32 for IPv4 or 128 for IPv6), thereby allowing lookup to be a simple longest-prefix match on the group or the group-source pair. Once downloaded, the multicast prefix list may be used to set up a longest-prefix match of the group, as well as for full group addresses, so that the preferred replicator may be dynamically selected during the RPF check in the same way as forward information base FIB lookups.

In sum, the systems and methods of the present disclosure allow for a centralized control policy for multicast replicator selection, thereby precluding the need for local configurations of replicators. As a result, the present disclosure allows for granular customizations on a per site basis. This granularity may be extended down to multicast groups and sources.

Figure 4:
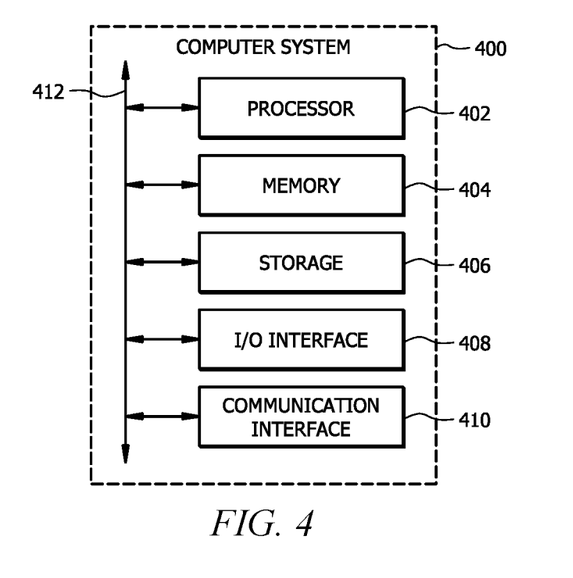
FIG. 4 illustrates a computer system, in accordance with certain embodiments.

Reference is now made to FIG. 4, wherein is shown an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system comprising:
   one or more processors; and
   one or more computer-readable non-transitory storage media comprising instructions that, when executed by the one or more processors, cause one or more components of the system to perform operations comprising:
   identifying, by a central controller, one or more replicators by analyzing multicast advertisements received from a plurality of edge devices;
   receiving, by the central controller, a preference related to selection of a particular replicator from the one or more replicators;
   updating, by the central controller, a multicast advertisement associated with the particular replicator to indicate the preference for replicator selection for a defined set of edge devices from the plurality of edge devices; and
   sending, by the central controller, the updated multicast advertisement to the defined set of edge devices.

2. The system of claim 1, wherein the plurality of edge devices are configured over a software-defined wide area network (SD-WAN).

3. The system of claim 2, wherein the preference is based on at least one of the following:
- a proximity of the particular replicator to the defined set of edge devices;
- a capacity of the particular replicator relative to the one or more replicators;
- a distribution of load of the particular replicator relative to the one or more replicators; or
- an administrative consideration.

4. The system of claim 1, wherein the preference comprises:
- a high preference associated with the particular replicator; or
- a low preference associated with the particular replicator.

5. The system of claim 4, wherein the high preference further comprises:
- a preemptive preference for directing existing multicast flows to the particular replicator.

6. The system of claim 1, further comprising:
receiving a control policy that is associated with a defined multicast prefix list associated with a set of multicast group prefix and prefix length tuples, and wherein the defined multicast prefix list is transmitted to the defined set of edge devices.

7. The system of claim 1, further comprising:
receiving a control policy that is associated with a defined multicast prefix list associated with a set of multicast group prefix, prefix length, and source tuples, and wherein the defined multicast prefix list is transmitted to the defined set of edge devices.

8. A method, comprising:
identifying, by a central controller, one or more replicators by analyzing multicast advertisements received from a plurality of edge devices;
receiving, by the central controller, a preference related to selection of a particular replicator from the one or more replicators;
updating, by the central controller, a multicast advertisement associated with the particular replicator to indicate the preference for replicator selection for a defined set of edge devices from the plurality of edge devices; and
sending, by the central controller, the updated multicast advertisement to the defined set of edge devices.

9. The method of claim 8, wherein the plurality of edge devices are configured over a software-defined wide area network (SD-WAN).

10. The method of claim 9, wherein the preference is based on at least one of the following:
- a proximity of the particular replicator to the defined set of edge devices;
- a capacity of the particular replicator relative to the one or more replicators;
- a distribution of load of the particular replicator relative to the one or more replicators; or
- an administrative consideration.

11. The method of claim 8, wherein the preference comprises:
- a high preference associated with the particular replicator; or
- a low preference associated with the particular replicator.

12. The method of claim 11, wherein the high preference further comprises a preemptive preference for directing existing multicast flows to the particular replicator.

13. The method of claim 8, further comprising:
receiving a control policy that is associated with a defined multicast prefix list associated with a set of multicast group prefix and prefix length tuples, and wherein the defined multicast prefix list is transmitted to the defined set of edge devices.

14. The method of claim 8, further comprising:
receiving a control policy that is associated with a defined multicast prefix list associated with a set of multicast group prefix, prefix length, and source tuples, and wherein the defined multicast prefix list is transmitted to the defined set of edge devices.

15. One or more computer-readable non-transitory storage media embodying instructions that, when executed by a processor, cause performance of operations comprising:
identifying, by a central controller, one or more replicators by analyzing multicast advertisements received from a plurality of edge devices;
receiving, by the central controller, a preference related to selection of a particular replicator from the one or more replicators;
updating, by the central controller, a multicast advertisement associated with the particular replicator to indicate the preference for replicator selection for a defined set of edge devices from the plurality of edge devices; and
sending, by the central controller, the updated multicast advertisement to the defined set of edge devices.

16. The one or more computer-readable non-transitory storage media of claim 15, wherein the plurality of edge devices are configured over a software-defined wide area network (SD-WAN).

17. The one or more computer-readable non-transitory storage media of claim 16, wherein the preference is based on at least one of the following:
- a proximity of the particular replicator to the defined set of edge devices;
- a capacity of the particular replicator relative to the one or more replicators;
- a distribution of load of the particular replicator relative to the one or more replicators; or
- an administrative consideration.

18. The one or more computer-readable non-transitory storage media of claim 15, wherein the preference comprises:
- a high preference associated with the particular replicator; or
- a low preference associated with the particular replicator.

19. The one or more computer-readable non-transitory storage media of claim 18, wherein the high preference further comprises a preemptive preference for directing existing multicast flows to the particular replicator.

20. The one or more computer-readable non-transitory storage media of claim 15, further comprising:
receiving a control policy that is associated with a defined multicast prefix list associated with a set of multicast group prefix and prefix length tuples, and wherein the defined multicast prefix list is transmitted to the defined set of edge devices.

* * * * *